(12) United States Patent
Potorti

(10) Patent No.: US 12,292,024 B2
(45) Date of Patent: May 6, 2025

(54) SYSTEM FOR CAPTURING ENERGY FROM WAVES IN A BODY OF WATER

(71) Applicant: Robert Potorti, Floyds Knobs, IN (US)

(72) Inventor: Robert Potorti, Floyds Knobs, IN (US)

(73) Assignee: Robert Potorti, Floyds Knobs, IN (US)

( * ) Notice: Subject to any disclaimer, the term of this patent is extended or adjusted under 35 U.S.C. 154(b) by 363 days.

(21) Appl. No.: 18/046,955

(22) Filed: Oct. 17, 2022

(65) Prior Publication Data
US 2024/0125296 A1    Apr. 18, 2024

(51) Int. Cl.
*F03B 13/14* (2006.01)
*F03B 13/20* (2006.01)
*F03B 13/22* (2006.01)

(52) U.S. Cl.
CPC ............ *F03B 13/148* (2013.01); *F03B 13/20* (2013.01); *F03B 13/22* (2013.01); *Y02A 20/144* (2018.01); *Y02E 10/30* (2013.01)

(58) Field of Classification Search
CPC ........ F03B 13/12; F03B 13/14; F03B 13/141; F03B 13/142; F03B 13/144; F03B 13/145; F03B 13/148; F03B 13/16; F03B 13/18–1895; F03B 13/20; F03B 13/22; Y02A 20/144; Y02E 10/30
See application file for complete search history.

(56) References Cited

U.S. PATENT DOCUMENTS

2010/0276933 A1* 11/2010 Costas ................. F03B 13/144
290/53

* cited by examiner

*Primary Examiner* — Loren C Edwards

(57) ABSTRACT

A system for capturing energy from waves in a body of water comprising: an artificial beach configured to remove water flowing backwards on the artificial beach; a plurality of guide walls each comprising wave actuators configured to convert wave energy to create compressed air; a top guide extending to cover a portion of the artificial beach and configured to create pressure; an air/water reservoir configured to receive high/pressure water flowing from a normally closed check valve in the top guide when the top guide stops the momentum of the waves; a vertical pipe with a bubbler stone configured to create air bubbles to raise water head and a supply of potential energy within a top water reservoir; and a plurality pipes each comprising a turbine generator configured to receive water leaving the top water reservoir to operate the turbine.

2 Claims, 9 Drawing Sheets

SYSTEM FOR CAPTURING ENERGY FROM WAVES IN A BODY OF WATER

BACKGROUND OF THE INVENTION

1. Field of Invention

This invention was created as an answer to extracting energy from wave power. Although many attempts were made over the centuries to accomplish this task effectively, none are close to the desired efficiency of other renewable energy sources. Much energy and time has gone into this design to make it able to cope with hurricanes and severe storms, and is described near the end of the detailed description portion. Because some parts of the device deal with new concepts, it's usually best to take one section at a time and get used to it, before moving onto the next part of the description. I believe I have finally created a method that will solve the problem of extracting substantial amounts of energy present in this resource. It has been estimated that the wave energy at the shores of the United States is equivalent to two thirds of all the energy used in the United States at this time.

2. Prior Art

One method uses the age-old float that generates power as it goes up and down with the waves (of course the base should be anchored to a solid foundation of some sort). The examples of this seem to go on and on forever and are too numerous to mention here. Another method that has recently been attempted is a snake like appendage that floats on top of the water and is jointed; as the joints bend, electricity is generated. Yet another inventor has two flat horizontal floats with a joint that generates power as the angle changes between the floats. Part of the problem is that the more energy one attempts to extract from waves using these methods, the more water will move to the sides or perhaps simply go over the top of the device. The rotating water (associated with wind driven waves) well below the waves is largely unaffected by most of the previous devices. More recently some people are trying to use an anchored platform that has flexible chambers filled with air and as waves go up and down air circulates from chamber to chamber, thus extracting useable power from the air that moves from chamber to chamber.

Another attempt to tap this energy is a mat that lays on the bottom of the area near a shore and as the mat's tension and compression undulates, it generates power. Yet another attempt is for waves to climb up an incline then as they fall back to sea level, they generate power from the potential drop.

3. Proposal for Improvement Over Present State of the Art

The new system (proposed here) would be able to extract power from a largely untapped source. Experiments have been done with nine known previous concepts (inventions), this invention would add three new concepts to the previous nine. This device should harness a greater amount of energy from a quantity of potential energy known to exist in the aquatic environment.

BRIEF SUMMARY OF THE INVENTION

There are many energy sources involving water and many ways to get energy from potential water situations. Energy can be obtained from water flowing in a river or stream, from a dammed river, tidal flow, even from water flowing deep under an ocean surface, and so on. Wave energy has a large potential of energy however, it also is harder to extract an appreciable percentage from this huge potential of power as attempts have been made to harness a higher percentage over the centuries. One method uses the age-old float that generates power as it goes up and down with the waves (of course the base should be anchored to a solid foundation of some sort). Another method that has recently been attempted is a snake like appendage that floats on top of the water and is jointed; as the joints bend, electricity is generated. Another attempt to tap this energy is a mat that lays on the bottom of the area near a shore and as the mat undulates, it generates power. Yet another attempt is for waves to climb up an incline then as they fall back to sea level, they generate power from the potential drop.

Some people believe that because some waves are smaller after they pass a wave conversion (conversion to useful energy) device, it is an indication of the efficiency of said device; however, this theory is not necessarily true as is evidenced in the numerus beaches around the globe that turn wave energy into turbulence and heat thus dissipating the energy with no real usable result.

This proposal involves a different approach that is both economical and (should be) more efficient than previous attempts of harnessing wave energy. There is a further description of how such a system would cope with bad ocean storms and hurricanes. As waves approach the device, they are guided by walls that have increasingly more aggressive wave guiding plates that compress air as waves hit the plates. The plates and walls are designed in such a way as to increase wave height at the center of the device and accumulate waves together, yet not allow much wave reflection back out into the open and instead utilize the otherwise reflected wave energy to create compress air (and assist the surging action).

As waves move towards the center of the device, they encounter a ramp that starts underwater then slopes up where the waves encounter a curved ceiling that squeezes the water (or basically leads the wave momentum into a dead-end chamber) into an area that has a check valve (or valves) that is spring loaded in such a way that the resulting surge forces water past the valve (or valves) and the resulting pressurized water (and some air) is then forced up a pipe to a tank. Water is then allowed to flow from the tank down another pipe to a water turbine. Some of the compressed air (generated from the guide walls) is used to assist the water coming up the first pipe and raise the water head (height of water) in the storage tank.

Water (in the elevated tank) would come out of the tank and into a downflow pipe (and flow past a turbine), then the water would deposit itself in a lower tank located below the surface of the water. In fact, it would deposit the water so low that it would actually deposit the discharge below the water level, the exit point of the pipe would actually be somewhat below the wave throughs (and not just below the water's average level).

So even though the lower tank is located below the surface, the discharge level is lower than the lowest part of the waves and some air is in the lower tank, and is adding to the overall working head of the water coming down the pipe. This is possible because there is a circulating motion below the waves (energy from the waves that is below the surface is the key). Through a series of check valves (placed correctly), wave action would be able to increase the head (working height of the water flowing in the system) to give additional energy to run a turbine. By depositing water below the surface this will increase the amount of power generated. It seems that the best way to accomplish this is a version of the Bernoulli effect (optional) underwater that would draw water out of the system, thus extracting the circulating momentum from below the waves and using that energy to increase the power output of the turbine. This would mean that the overall head would be increased by a number of feet and, this of course would take even more energy from the waves as the working head is increased. All of it done economically and with parts made commonly today.

DETAILED DESCRIPTION OF THE INVENTION

The system described here uses three separate processes all meant to complement each other in such a way that a much higher percentage of energy is extracted from the total potential energy that waves possess. The different methods will be explained first with the surging method, then compressed air enhancement (a second surging method) then another method to extract the circulatory motion that is naturally under waves.

Today there are basically three authorities that will give accurate information on wind driven waves, they are The US Navy Research Department, Europe Wave and Pac Wave in Oregon. Information given by private companies that tout their ideas, often give false or inaccurate information and it can be difficult to negotiate a sea of false information and exaggerated claims on this subject. Motivation to exaggerate certain claims can sometimes be finically beneficial to a private company when they want funding or want people to invest in their venture. Designing such a device and applying all the math for expected output, stresses and materials became much easier once the correct information from actual real data was obtained.

According to Europe Wave, the potential of wave surging holds approximately twice the potential energy as other forms of movement that collect such wave energy. Two of the three concepts in this invention collect wave energy in this fashion; the other one utilizes mostly an up and down motion, but is used to enhance the overall efficiency of the invention. Energy can be extracted by any one of these three methods, however combining all of them together should create a more efficient process for a given amount of wave energy in a specific wave environment.

The methods mentioned here would accomplish such extraction by converting wave action into flowing water within the structure, and using a turbine (or other mechanical method equivalent to a turbine) to covert the flowing water into electricity (or perhaps another useful energy medium). Because turbines and the like are in common use throughout the world, details of their operation plus power distribution on land are not detailed here. Details of this patent application concentrate more so on the advances that have not been done before.

The particular design described here has been put together in a way so as to use the smallest number of moving parts coupled with the simplicity in manufacture of assembling parts that are already being manufactured in quantity. It is the concepts of the new processes that are being applied for in this patent, and not the physical aspects of the figures that happen to be shown here to demonstrate such concepts.

Figure 1A:
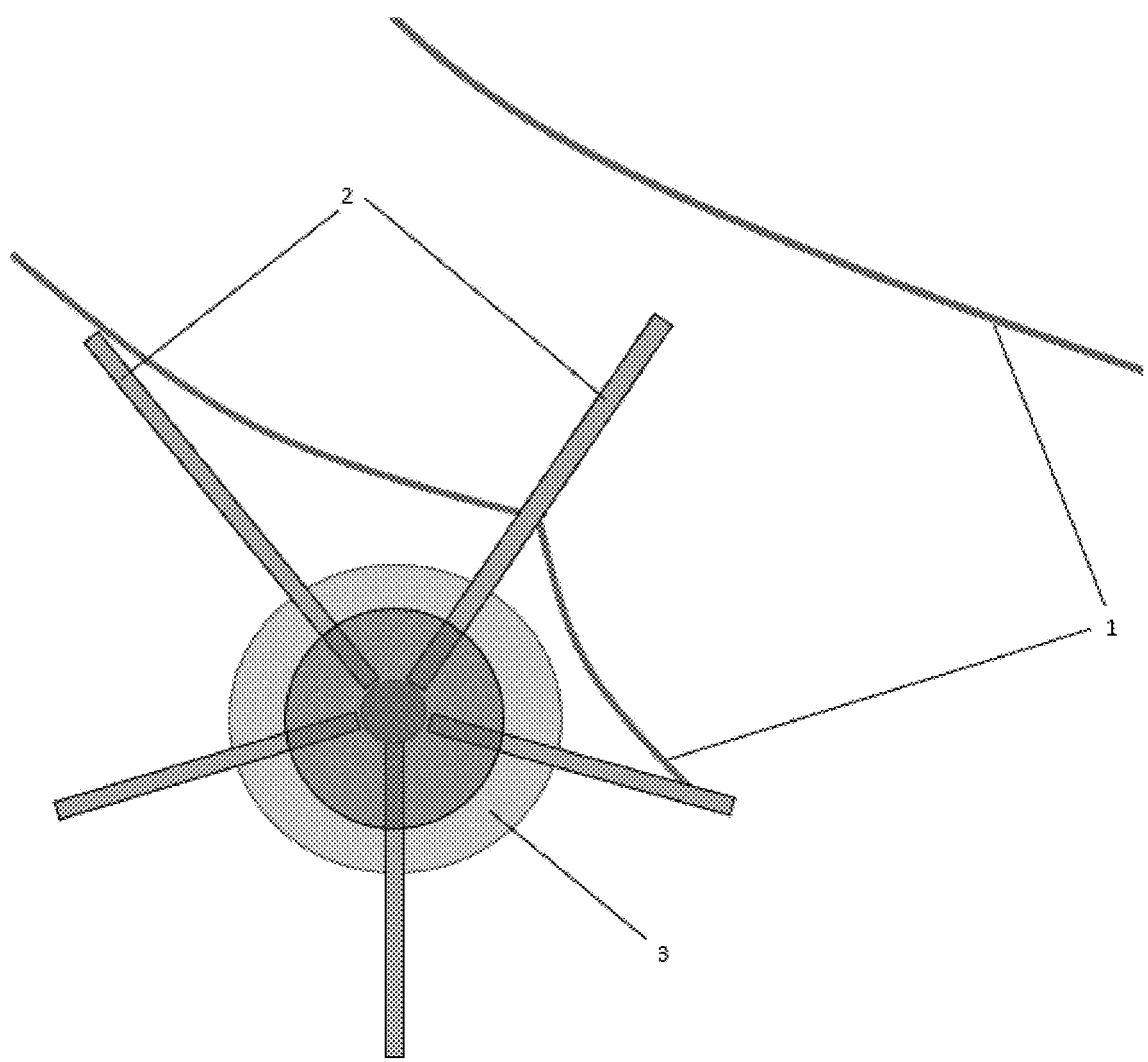
FIG. 1A is a view of the invention as one would look down from above as the wave crests encounter the structure.
Figure 1B:
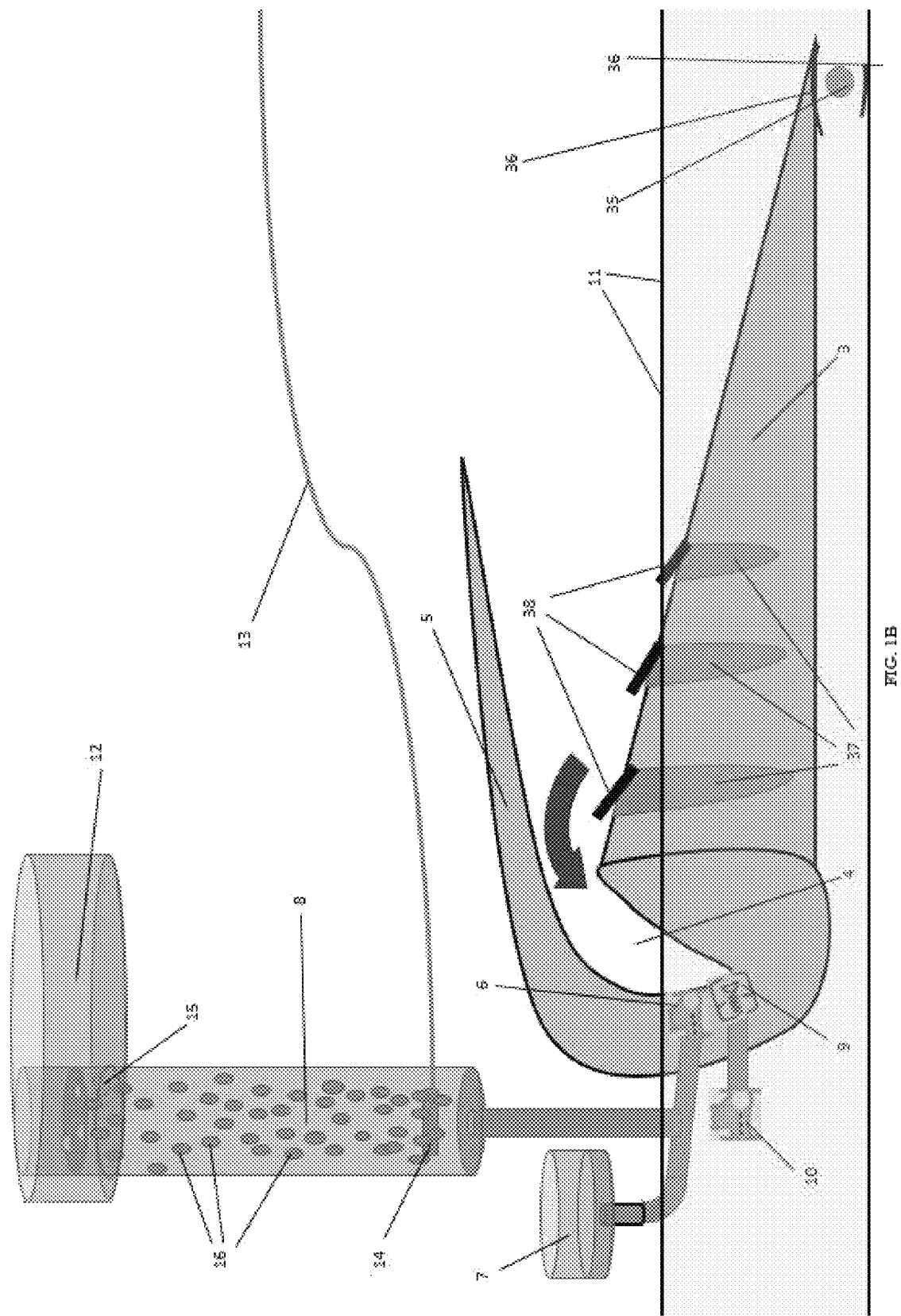
FIG. 1B is a side view of an incline or artificial beach that waves push up onto and strike a cavity; the resulting force opens a spring-loaded check valve/valves.

FIGS. 1A and 1B shows how wave crests 1 would come towards the system (as seen from above in 1A) in a deep-water ocean scenario. Guide walls 2 funnel waves to the center of the device (system) and increase wave height as well as lower wave troughs. As waves come onto an artificial beach FIG. 1B, 3, they move to an area where they spill over the top then down to a trough 4. A structure (top guide 5) goes over the top of the artificial beach and the top guide keeps waves from reflecting energy backwards and upwards as the water momentum suddenly stops. The force of the water between the artificial beach 3 and top guide 5 helps prevent the force from dissipating too quickly along with the mass of water still behind the artificial beach 3 and top guide 5. Top guide 5 may or may not be allowed to flex to capture more wave energy when waves are larger, depending on materials it is made of and the durability of the materials. Check valve 6 is normally closed and it opens because of the resulting pressure that is present in the chamber as this happens. When opened, high pressure water flows from the valve and into both the air/water reservoir 7 and into a vertical pipe 8. (Check valve 6 can be multiple valves that connect to the vertical pipe 8.) Air that has compressed in the air/water 7 reservoir then pushes water back out to the vertical pipe 8 between wave crests. Check valve 9 is normally opened, however will close under high pressure. Check valve 10 only allows water out of through, so water will drain into wave troughs between wave crests (water in through is actually below sea level, if no waves are present). Thus, water is draining into air that is in wave troughs and below the water's naturally occurring level. (Line and shading represent water level when no waves are present 11) Because no water would be in the chamber 4 when a new wave pushed into it, the wave would strike with more force than it would if water was present. Water leaving pipe 8 would go past check valve 15 into reservoir 12 that would hold a supply of potential energy for a water turbine to operate smoothly. Air that was compressed elsewhere (in the system) comes in a hose 13 and goes to a bubbler stone 14 (similar to a stone used in fish tanks for the purpose of lifting water up a pipe). Bubbles 16 rising up help to raise the water head in the vertical pipe 8. FIG. 3 shows a two-tank arrangement. 12A is the lower tank and 12B is the upper tank in FIG. 2 and FIG. 3, however in actual practice there could be multiple tanks. Some figures (where needed) show one tank systems and some figures show two tanks so as not to distract from the main principals being demonstrated in the description sequence. Check valve 17 opens with no pressure in the vertical pipe 8, however it will close at medium pressure in the vertical pipe 8. Check valve 18 opens at medium pressure in vertical pipe 8, and check valve 19 opens at high pressure, so if there are small waves (and not much pressure in pipe 8) valve 17 is opened and fills tank 12A, then as wave strength increases, valve 17 closes and valve 18 opens and at that point no more water fills tank 12A but instead fills tank 12B. As pressure increases, water starts to come out of valve 19 into tank 12A at that point, water will actively fill both tanks (12A and 12B). The tanks and their height are of course only one method of storing the energy brought in from wave energy. Other methods of energy storage can be used such as compressed air in a single tank, however in this description water height and gravity are being demonstrated as a way to store the energy between wave crests. The designs of the system that use varying pressure in one tank would adjust to wave strength and increase pressure as pressure accumulated in the storage tank (thus, adjusting for varying wave sizes by largely varying pressure inside the reservoir tank). As air from water turbulence enterers such a system, it would add to the compressed air and help make the system self-regulating, however computers and sensors will probably be incorporated at some point in the future.

Figure 1C:
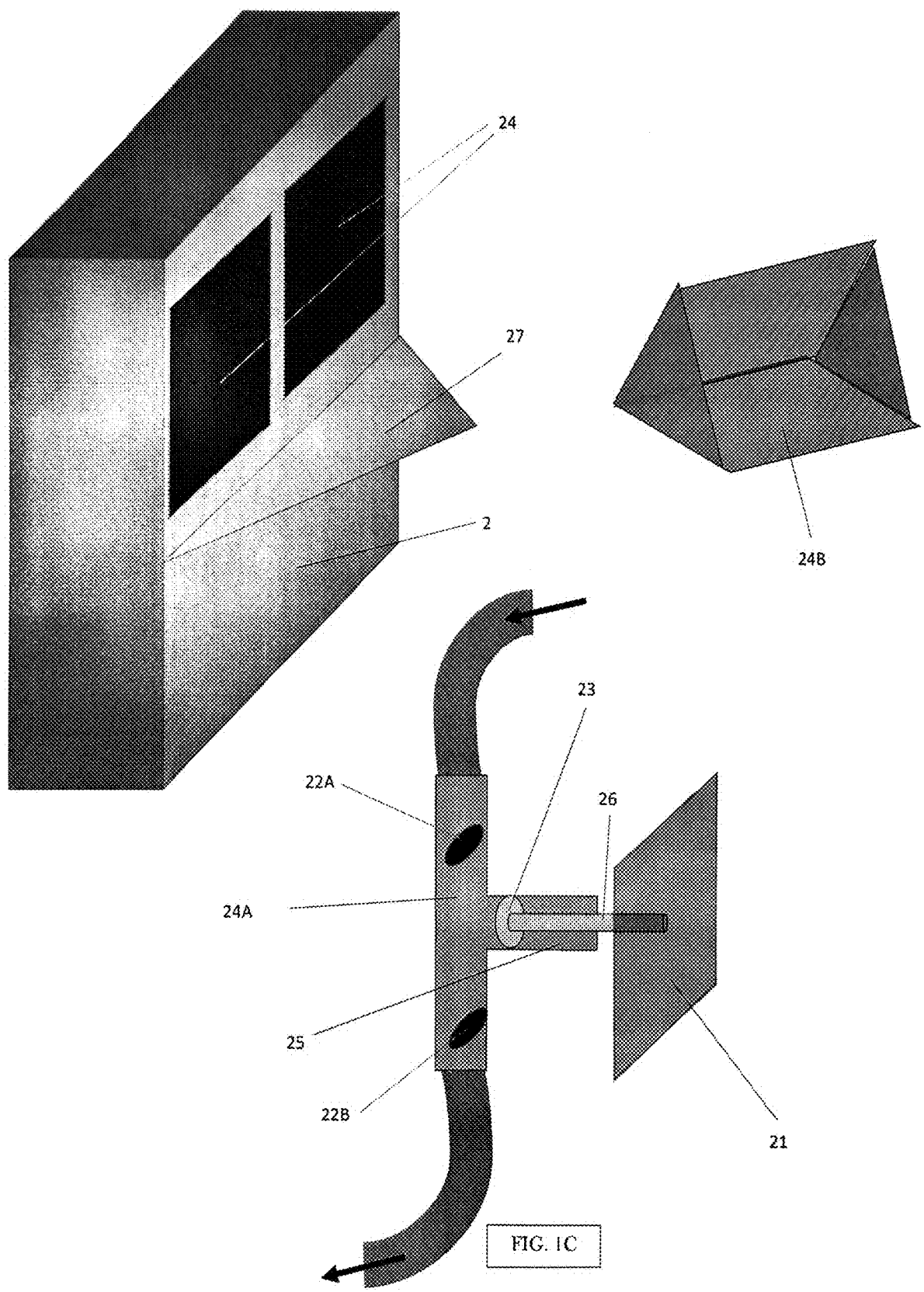
FIG. 1C is an example of how walls guide waves towards the center of the device yet use some of the energy that might be lost because waves were otherwise reflected back out into the open water. A small section of the wall is shown (not the entire wall).
Figure 2:
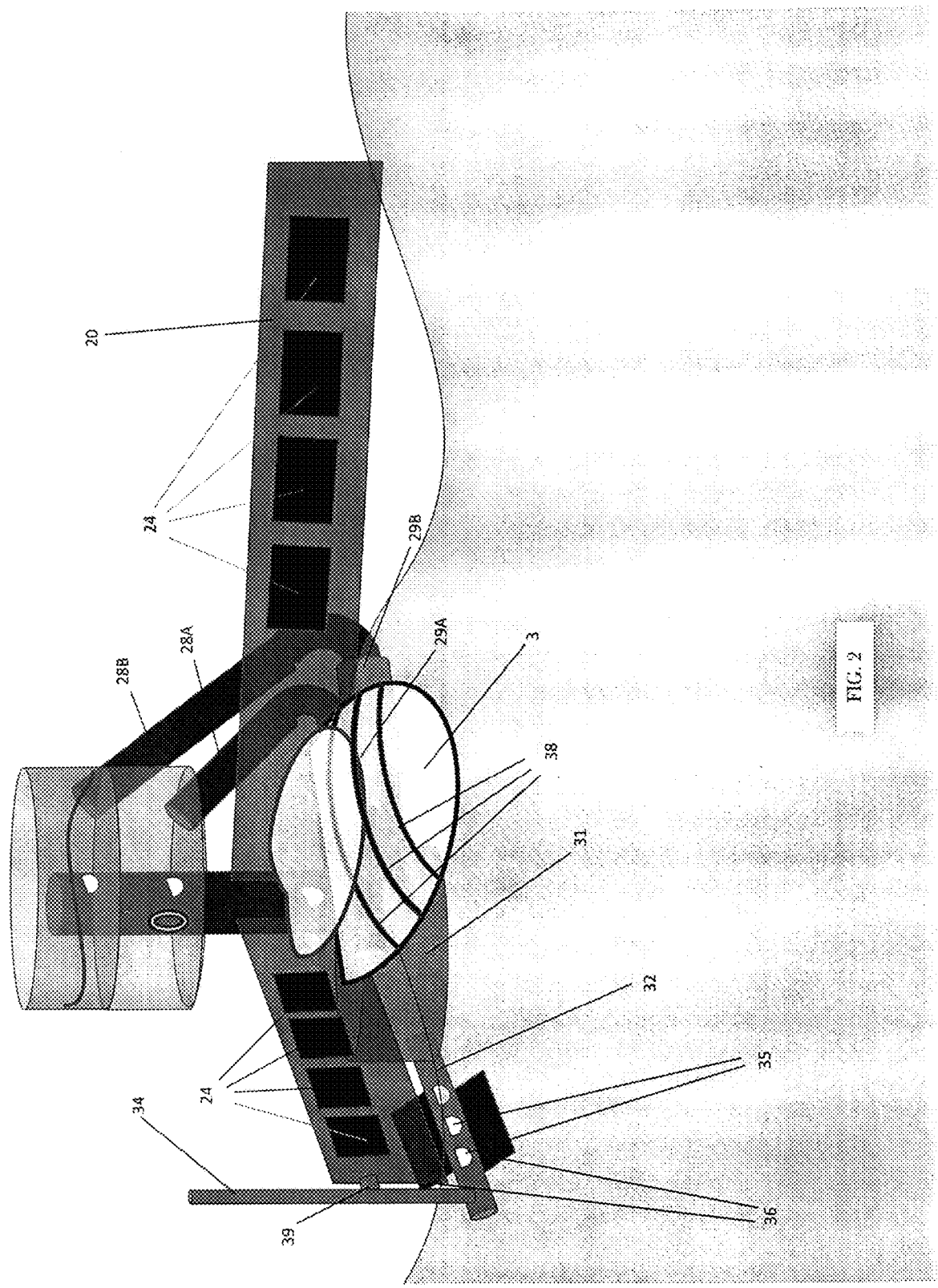
FIG. 2 Shows how waves would be funneled to the artificial beach by the guide walls with water storage tanks elevated so the turbines would run steady; it also shows part of the drainage system that can drain below the surface of the water.
Figure 3:
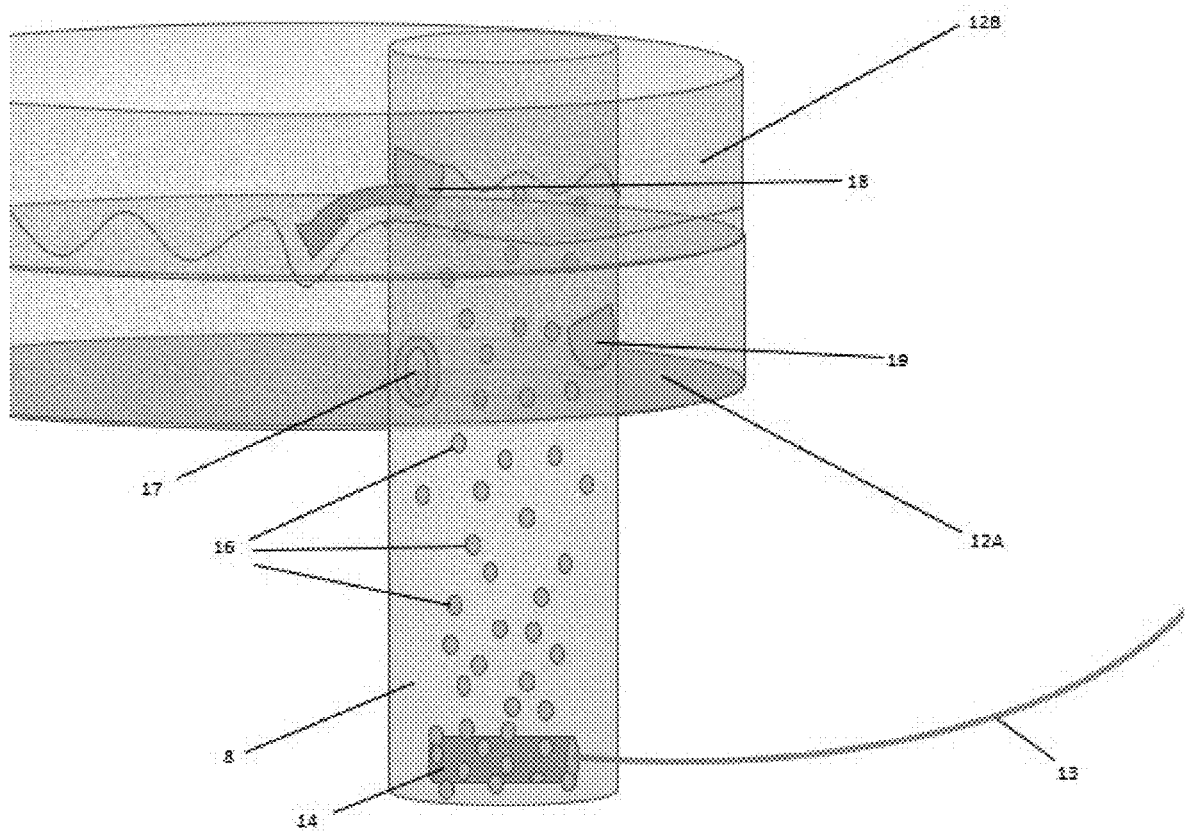
FIG. 3 Shows what happens after air is compressed (from bubbles within the waves and air that was compressed within the guide walls) as it can be used to assist the flow of water up the pipe as it travels to the storage tanks, by using a bubbler stone.
Figure 4:
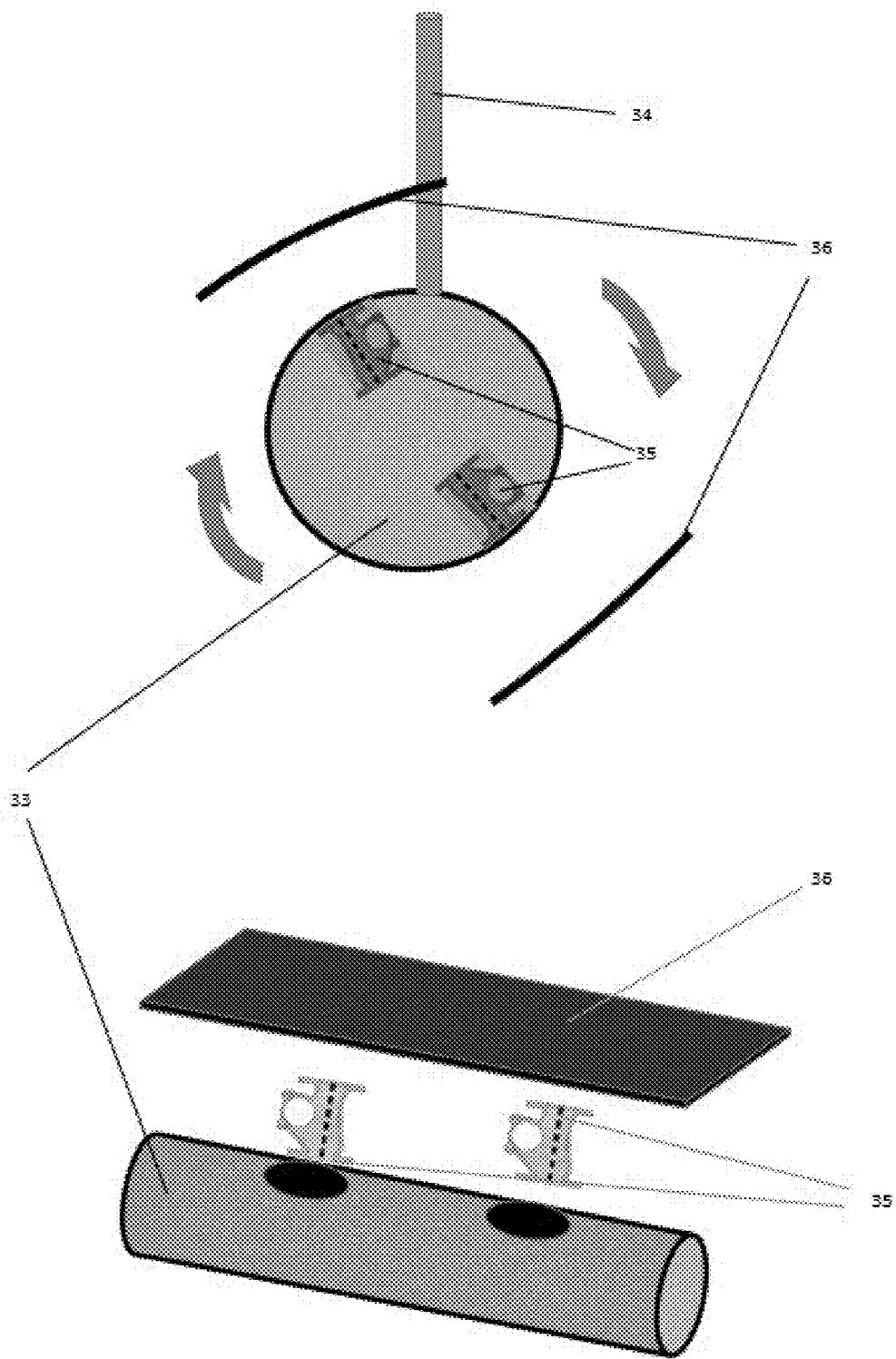
FIG. 4 shows how water would be pulled out of the drainage system (located below the surface of the open water) by using the circulatory flow of the waves.
Figure 5:
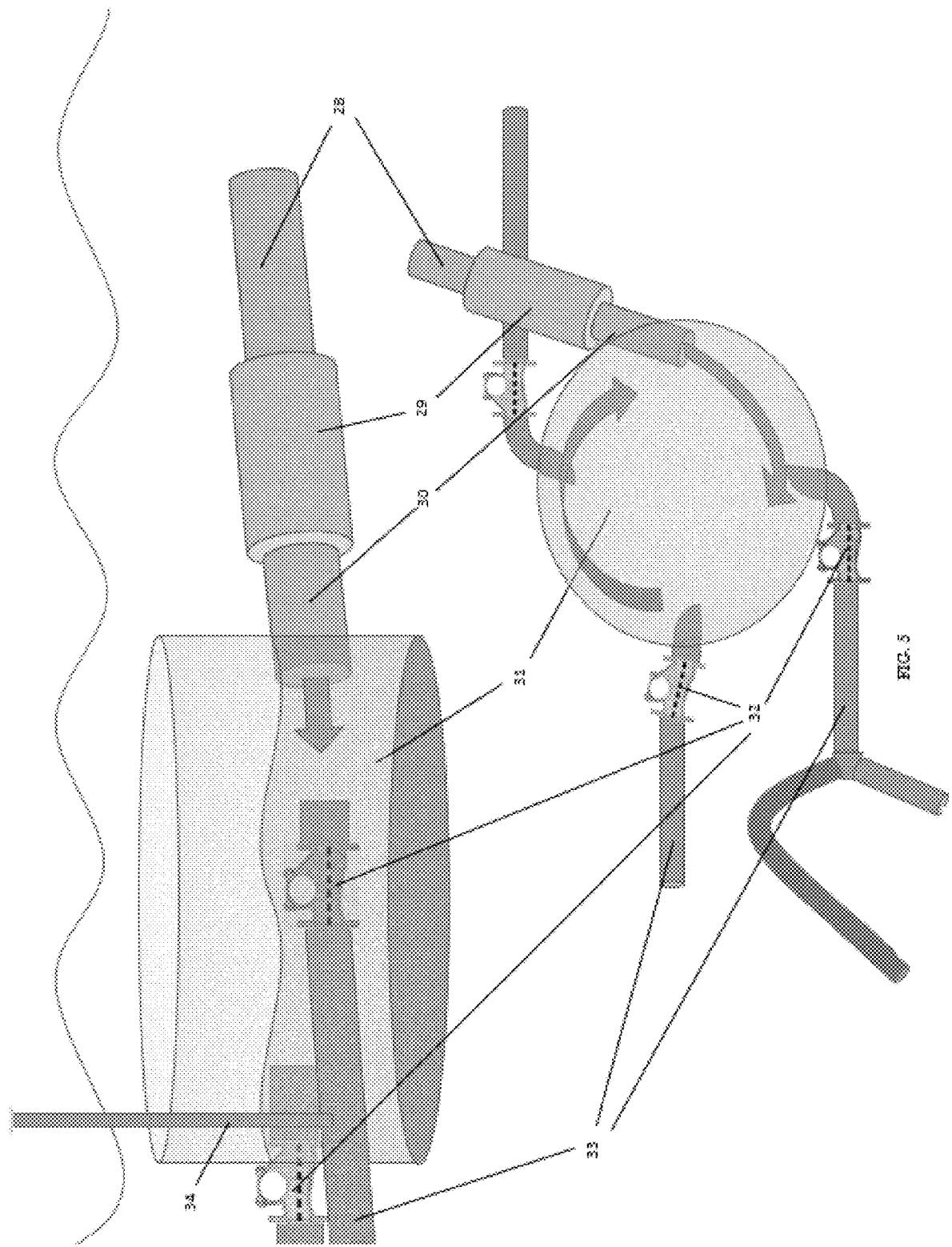
FIG. 5 shows where water goes after a turbine has extracted energy from the falling water within the pipe. The water would then flow into a tank then flow to an underwater drainage system.

In FIG. 2 waves push against guide wall 20, as waves are funneled towards the artificial beach 3, some of the energy pushing against walls 20 gets converted to compressed air by the air pumps and plate configurations. FIG. 1C shows a section of wall 2 as waves push against wave actuator 24, air is compressed behind each plate 21, air from outside enters and goes past check valve 22A then gets compressed by piston 23 in cylinder 25, after the compressed air goes past 22B, it then goes to the bottom of vertical pipe 8 (in FIG. 3) where a bubbler stone helps the column of water rise to the tanks. As waves strike wall 20, waves funnel into the center of the structure. As the walls extend further away from artificial beach 3 the waves encounter more and more aggressive wave actuators (from 24A to 24B) that convert wave energy (waves that hit head on with the walls) to create more compressed air, in this way waves that interact almost parallel with the walls 20 and actuators 24A and 24B get guided to the artificial beach 3, waves that encounter guide walls further away from the artificial beach at a perpendicular angle to the wall tend to compress more air for use largely in the vertical pipe 8. A rod 26 pushes and pulls piston 23 as plates 24 go back and forth, a spring (unseen) can be arranged in a way so as to return the piston to the extended position. Flanges 27 can be used increase the energy captured by the compressors. Of course, compressors do not need to be cylinders and pistons, but can be diaphragms type or any compressing technique that can assist in the generation of power or even be used on its own for power generating purposes.

Another way to accumulate wave energy, and avoid using the compressed air technique in order to avoid waves reflecting back away from the device is to build more walls having less degrees of separation between them.

Water in tanks 12A and 12B would come down one or more intake pipes 28A and 28B, then go through turbine/generators 29A and 29B, after leaving the turbine, water would be discharged in the discharge pipe 30, from there the water would enter a discharge tank 31 (located below water level), as water circulates in the discharge tank 31 it is allowed to go out of the tank and into various pipes (placement piping) 32, from there water travels down more piping (drainage piping) that would release (or extract) water under water under low pressure due to water movement below the surface 33. Vent pipes 34 are there to prevent water hammer and are located in various areas. Check valves 35 in piping 32 will only allow water out of the pipes. While the drainage system will function this way with the rotational motion of waves (under the surface). Vanes 36 can be added in order to obtain the Bernoulli effect more efficiently, making a low-pressure area right where the check valves area located as the water rotates. Positioning, orientation and shape of the vanes 36 can be altered in order to obtain the best outward flow (from the pipes or even an under-water tank) depending on placement on the overall device and the size of common waves in the area. Discharge pipes 32 and vanes 36 can be stacked {at different heights} in order for drainage to take places at lower depths, the pipes 32 and vanes 36 can be used without the discharge tank, they should be placed correctly to be efficient as possible for normal conditions in the area they are to be used), and height of the water in the discharge tank, in order to remove water flowing backwards on the artificial beach, drainage slots 37 are put into the beach with flexible flaps 38 that would drain water that is moving back out to deeper water in FIG. 1B & FIG. 2 water exiting down the slots eventually comes to check valves (not shown) before going to an underwater piping system and check valve configuration that is deeper down under water than most of the other pipes and check valves (below sea level, using wave action to draw down the water within the system).

Figure 6:
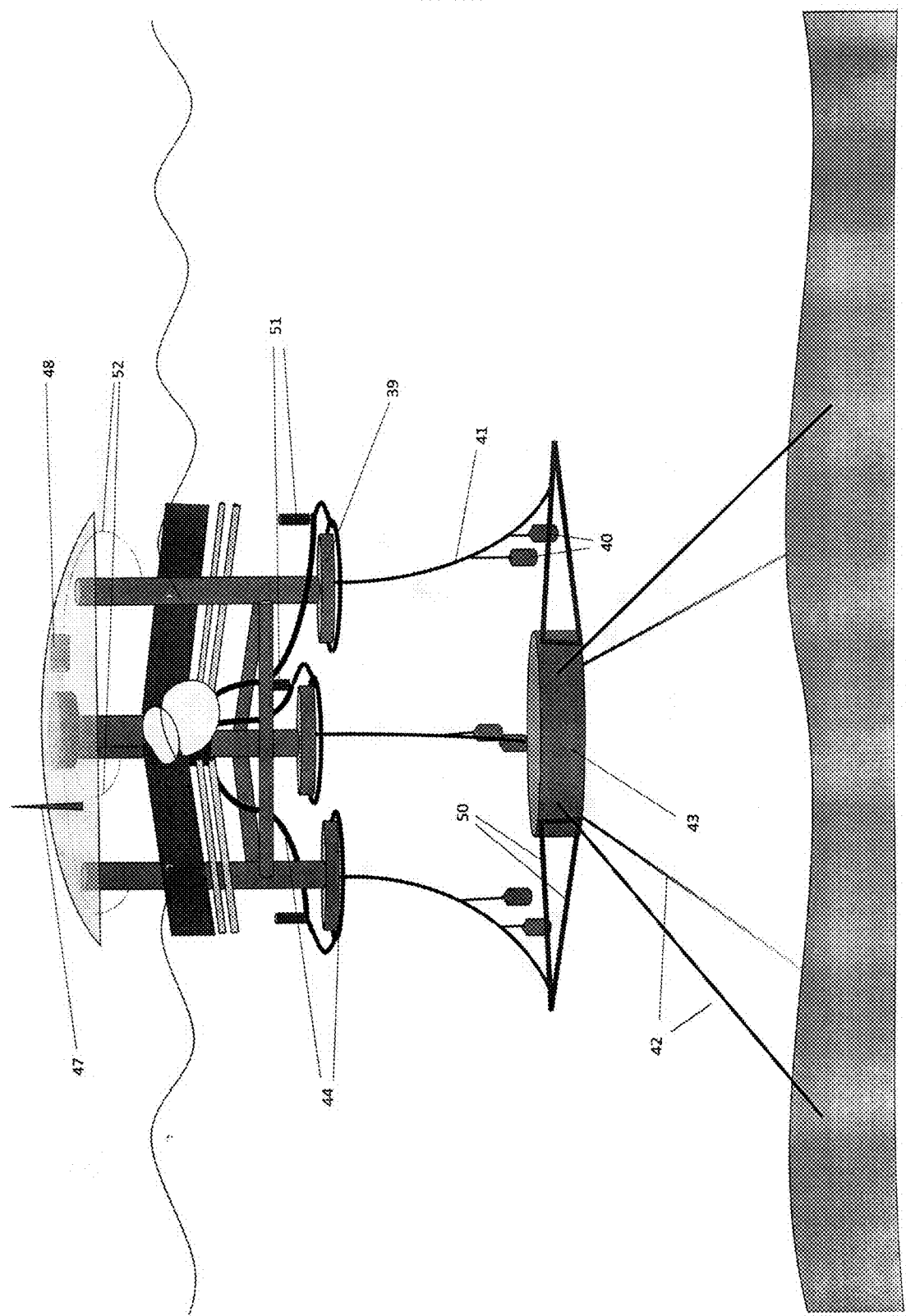
FIG. 6 shows the structure from afar with some of the structure above the open water and some of it below the open water. The lower structure is anchored to the ground under water and cables are kept taught by a buoyant part of the structure. Weighed cables keep the upper structure in place and erect. Some parts of the upper structure can be seen, however there is less details shown in the FIG.
Figure 7:
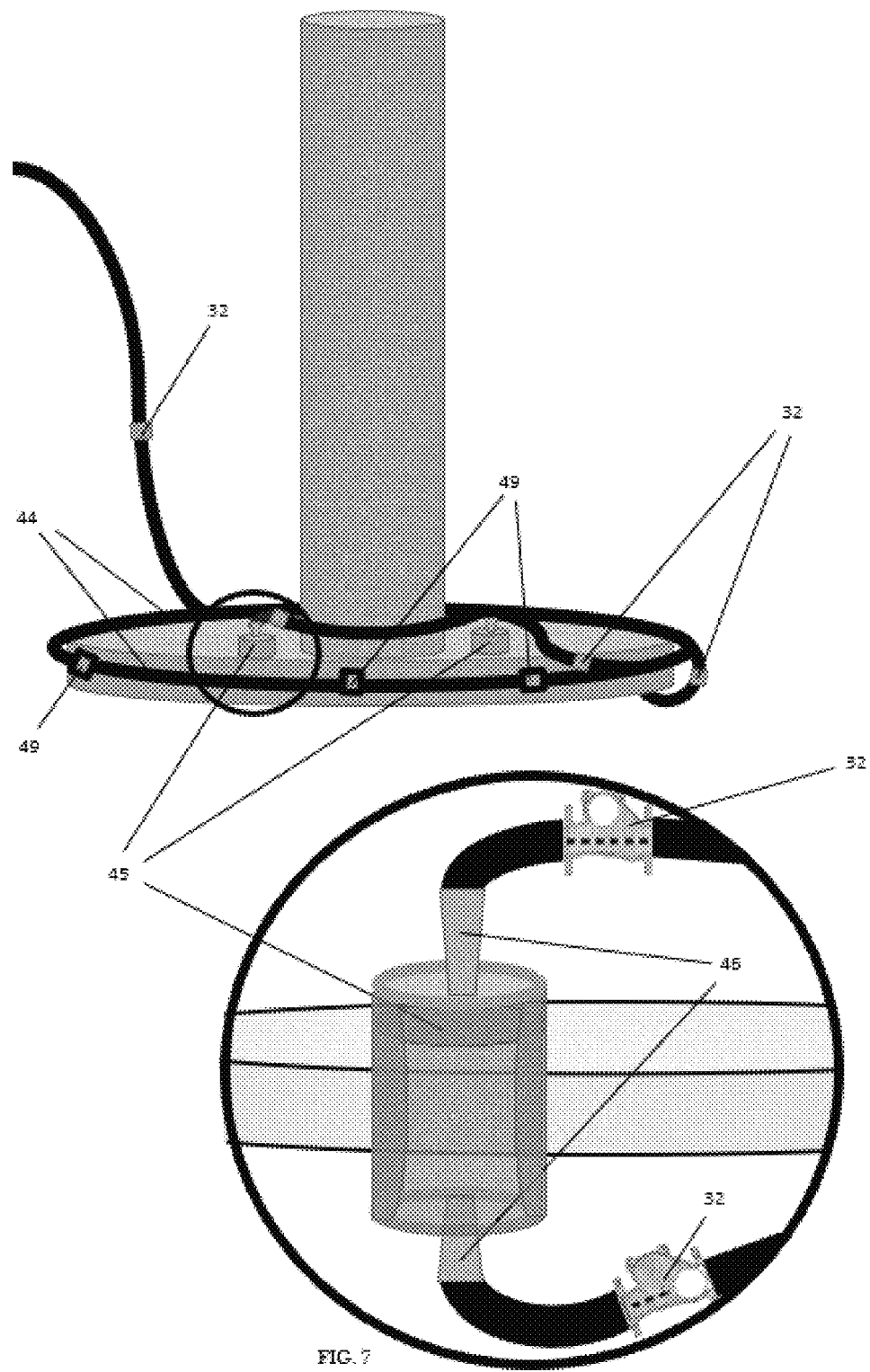
FIG. 7 is showing how the lower part of the under-water drainage system functions. A closer look at a detailed part is shown in the circle.

FIG. 6 shows how the structure can be arranged in its entirety both under water and above water. Because there is normally little movement deep underwater dampening plates are placed at the bottom of upper structure 39 as it floats in order to reduce any rolling or up and down movement. Weights 40 can also be added to the upper structure 41 mooring cables. Lower mooring cables 42 are kept taught by an overly buoyant float 43. Some of the water coming from the lower tank goes through a piping-hose system 44 down to the damping plates, where turbulence and water resistance helps reduce movement of the upper structure. FIG. 7 shows a closer view of the damping plates; the plates have hose (or pipe) going around the outside edge of the plates, check valves 35 expel water from lower pressure of water moving around the outside of the plate (as it moves up and down from swells and long waves at the surface). In the area more at the center of the plates, there are venturis 45 that have nozzles 46 so that as water flows from one side of the plate to the other, discharge water will be drawn out of the nozzles 46. The venturis are meant to work in two directions when mounted on a plate (as water goes back and forth from one side of the plate to the other). The in-line check valves 32 keep the water only flowing in one direction (allowing water to flow in only one direction of the internal system due to lower pressure at each port or external check valve because of the water's natural wave movement below the surface). In this way, the energy taken from unwanted movement of a structure at sea (or anywhere sizeable waves are present) is put to use adding useful energy to the turbine. This especially may be useful with long shallow undulating waves. The same method of using underwater turbulence can (and should) be used on other structural members of the upper and lower parts of the structure to sap as much residual power as can economically be done; check valves would be placed in numerous places along the drain lines (even in places where no vanes are placed so as to capture the circular motion below the water's surface. 49 are check valves that let water exit as water flows around the outside of the horizontal plate and forms a low-pressure area there as well.

In the version shown here, the entire upper structure is meant to submerge below the surface during heavy storms and hurricanes in order to protect the structure from damage. Because of the unpredictability of hurricane directions, sometimes one hurricane is being followed closely by another hurricane coupled with the differences in air pressure near a hurricane's eye, it would seem at this point the only practical system would be to monitor the weather from a safe area and send radio signals to a mast that sticks out of the water while the structure is submerged. It would also be remotely operated as to when to submerge prior to any damaging conditions. Compressed air and remote-controlled valves could be a way to avoid damaging conditions and control the upper structure's buoyancy, so it can submerge and avoid structural damage. FIG. 6 shows how a system like this could work. 47 would be a radio signal receiving mast that stays above the water. 48 is a compressed air tank that can push air into the vertical supports and walls when the structure is ready to resurface and water would exit the structure near the bottom of the upper structure through opened ports. 52 are the lines that go from the tank to the supports. 50 are the outriggers that give stability to the upper structure so as wind and waves push it in any direction, the upper structure will not tend to move or tilt as much in said direction; if prototype tests show that the upper structure moves too much and tilts, then a long shaft (or guide) may be placed on the float (or lower structure) 43 that allows the upper structure to raise up and down vertically and remain directly over the lower structure. Individual valves (not shown) in the compressed air lines are placed in various positions and controlled by a computer that senses the upper structure plumbness; this is because as waves hit the upper structure, they will tend to drag it along with the waves. So that even though the lines 41 (FIG. 6) pull in the direction of the waves somewhat, the upper structure will stay largely level and plumb. Because of the surging action of water in lines 44, water hammer arresters 51 are installed near the base of the water lines.

Please note that even though most of the wave energy is on or near the surface and the wave energy tends to get weaker exponentially as depth is increased; the upper structure would transmit energy as it goes up and down on the surface to the lower part of the upper structure which is in water that has very little movement (and possibly none). Because the wave energy level goes down exponentially from the surface, the overall height of the upper structure does not have to be overly high to get these desired effects.

In areas where the water is not so deep (FIG. 6) that that the entire lower structure is not needed, then cables 41 are simply anchored to the bottom (of the ocean, sea or lake).

The upper structure is constructed in a way as to adjust for tidal rising and falling along with some degree of storm surge, yet is able to buffer energy that would otherwise be transmitted to the upper structure and cause unwanted movement.

For clarity and to demonstrate the basis of the new concepts, details about corrosion control, paints, sacrificial anodes and maintenance plus the various types of check valves along with vanes that direct water flow are not mentioned in detail here. Different symbols for check valves are shown so they can be better represented in the positions of the valves within the figures.

In areas where compressed air is shown, other means of transferring useful work may be substituted.

The invention claimed is:

1. A system for capturing energy from waves in a body of water, the system comprising:
   a generally circular artificial beach moored in the body of water, the artificial beach comprising a sloped surface extending circumferentially from a peak at a center of the artificial beach and lowering gradually into the water at an outer circumference of the artificial beach, a plurality of flexible flaps on the sloped surface, the flexible flaps configured to remove water flowing backwards on the artificial beach;
   a plurality of guide walls extending radially outward from the center of the artificial beach and perpendicularly to the sloped surface, the guide walls configured to funnel the waves to the center of the artificial beach, the plurality of guide walls each comprising wave actuators configured to convert wave energy to create compressed air, the wave actuators each comprising a plate configured to push a piston in a cylinder of the wave actuator;
   a top guide extending upwardly and radially outward from the center of the artificial beach to cover a portion of the sloped surface of the artificial beach, the top guide configured to prevent the waves from reflecting energy by stopping momentum of the waves and creating pressure;
   an air/water reservoir positioned at the center of the artificial beach and fluidly connected to the top guide by a normally closed check valve within the top guide, the air/water reservoir is configured to receive high/pressure water flowing from the normally closed check valve when the top guide stops the momentum of the waves;
   a vertical pipe extending upwardly from the center of the artificial beach and fluidly connected in parallel to the air/water reservoir downstream of the normally closed check valve, the vertical pipe comprising a bubbler stone, a top check valve positioned in a top of the vertical pipe, and a top water reservoir positioned at the top of the vertical pipe, the bubbler stone configured to create air bubbles within the vertical pipe to raise water head in the vertical pipe and cause water within the vertical pipe to enter the top water reservoir through the top check valve thereby creating a supply of potential energy within the top water reservoir; and
   a plurality of intake pipes fluidly connected to the top water reservoir, each of the intake pipes comprising a turbine generator configured to receive water leaving the top water reservoir to operate the turbine.

2. A method of capturing energy from waves, the method comprising:
capturing the energy from the waves using the system of claim 1.

* * * * *